April 25, 1967 B. D. LOUGHLIN 3,316,351

BLACK LEVEL CONTROL CIRCUIT FOR A TELEVISION RECEIVER

Filed Oct. 24, 1963 2 Sheets-Sheet 1

April 25, 1967 B. D. LOUGHLIN 3,316,351

BLACK LEVEL CONTROL CIRCUIT FOR A TELEVISION RECEIVER

Filed Oct. 24, 1963 2 Sheets-Sheet 2

United States Patent Office 3,316,351
Patented Apr. 25, 1967

3,316,351
BLACK LEVEL CONTROL CIRCUIT FOR A TELEVISION RECEIVER

Bernard D. Loughlin, Centerport, N.Y., assignor to Hazeltine Research Inc., a corporation of Illinois
Filed Oct. 24, 1963, Ser. No. 318,608
6 Claims. (Cl. 178—7.5)

The present invention relates to a picture control circuit for a television receiver, and, more particularly, to an improvement of the circuits described in copending application Ser. No. 309,774, filed Sept. 18, 1963 and entitled, "Black Level Control Circuit for a Television Receiver." With the circuits of this copending application the beam current flowing in the cathrode-ray type picture tube is limited to reduce any annoying subjective effects that may be produced upon the viewer due to changes in scene brightness and to minimize the possibility of high voltage power supply overload on scenes of high average brightness, while, at the same time, maintaining correct black level operation in the reproduced picture.

While the aforementioned circuits are completely adequate to perform their intended functions, a control circuit constructed according to the present invention additionally compensates for any black level drift that may occur in the reproduced picture due to the manner in which the black level stabilization feature of the previous circuits is achieved.

It is an object of the present invention to provide a picture control circuit for a television receiver which exhibits the same desirable features of beam current limiting and black level stabilization as circuits described in the above mentioned application and which additionally exhibits those features independent of the nonlinear translation characteristics of the picture tube and video amplifier employed.

In the discussion that follows, it is to be understood that the nonlinear translation characteristic of the video amplifier is due to the unequal translation of the alternating-current (A.-C.) and direct-current (D.-C.) components of the supplied video signal through the video amplifier, and, more particularly, due to the degeneration of the D.-C. component of the video signal within the video amplifier.

In accordance with the present invention, there is provided a picture control circuit for a television receiver including means for supplying a video signal having an average value which may vary from scene to scene and having a plurality of mutually related levels, one of which is intended to correspond to black in the reproduced picture. The control circuit also includes means including a first network for coupling the video signal to the cathode-ray tube thereof and means coupled to the coupling means for stabilizing the intended black level at the cathode-ray tube, but which is responsive to a level other than that level. The control circuit additionally includes means for varying the magnitude of the supplied video signal in response to variations in its average value to limit the amount of beam current flowing in the cathode-ray tube, thereby producing undesired variations of the intended black level at the tube, the undesired variations being related to the average value of the supplied signal. The control circuit finally includes means for compensating the undesired variations, means which include a second network coupled between the cathode-ray tube and the stabilizing means and a third network coupled between the coupling means and the stabilizing means, each of the first second and third networks providing transmission characteristics from the supply means through their respective networks which are interrelated. In this manner correct black level operation is maintained in the reproduced picture.

For a better understanding of the present invention together with other and further objects thereof, reference is had to the following description taken in connection with the accompanying drawings, and its scope will be pointed out in the appended claims.

Referring to the drawings.

GENERAL

Figure 1:
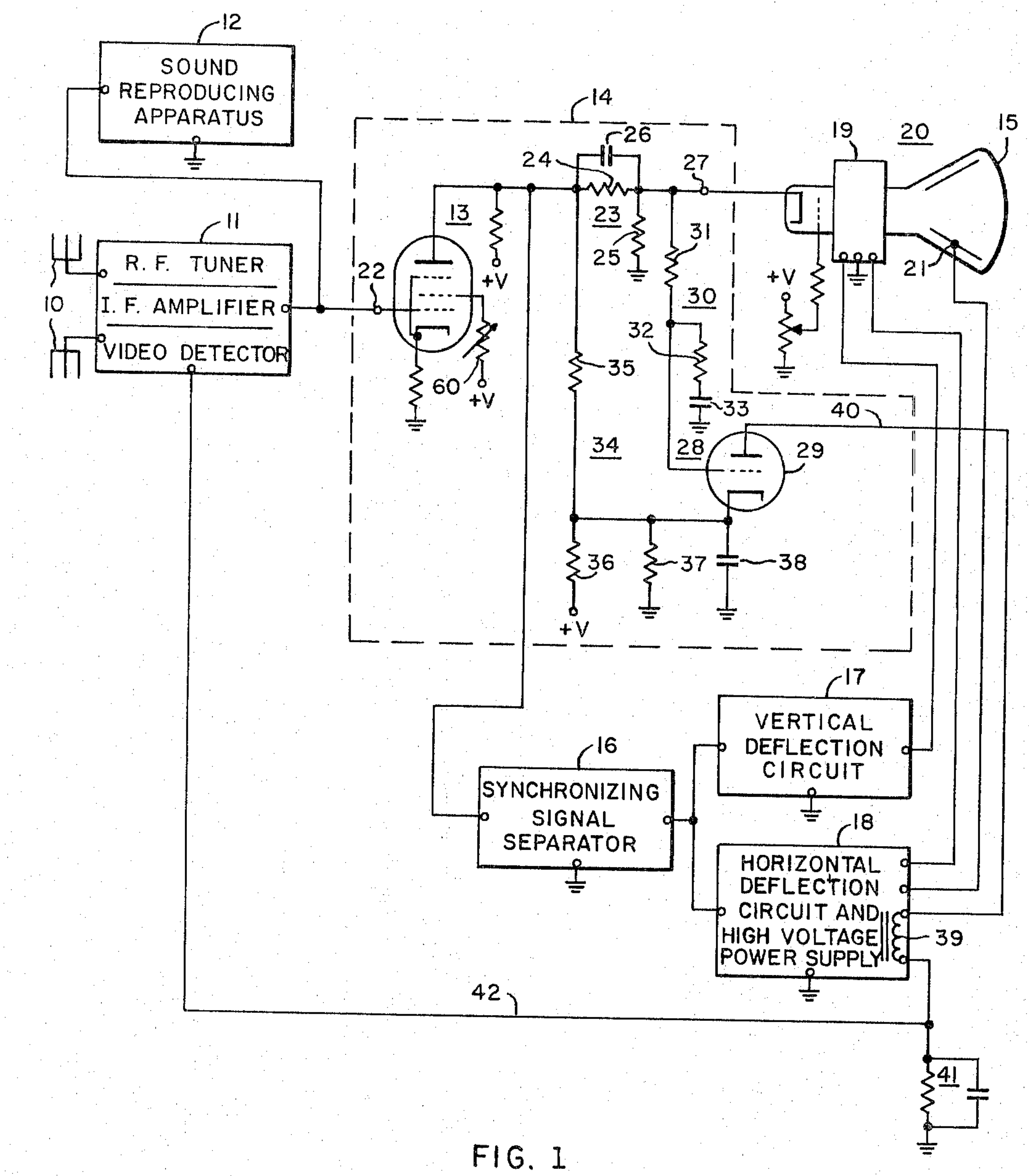
FIG. 1 is a circuit diagram, partly schematic, of a television receiver employing a picture control circuit constructed in accordance with a particular form of the present invention.

Referring to FIG. 1, there is shown a television receiver embodying a picture control circuit constructed in accordance with one form of the present invention. Thus, with the exception of the control circuit, and unless otherwise noted, the receiver may be of conventional construction. The receiver comprises, in part, antenna system 10, coupled to the input of unit 11, which includes the usual radio-frequency (RF) tuner, intermediate-frequency (IF) amplifier, and video detector from which are derived a sound modulated intercarrier beat note component and a video signal component. The sound component is applied to sound reproducing apparatus 12 wherein it is amplified, detected, and reproduced by the sound reproducing device.

The video signal component is D.-C. coupled from the video detector in unit 11, with the synchronizing pulses extend in a negative direction from the blanking level, to the control grid of video amplifier 13 located within control circuit 14 wherein it is amplified, reversed in polarity and applied through the remainder of control circuit 14 to a cathode-ray type image-reproducing device or picture tube 15, in a manner to be subsequently described. The video signal developed by amplifier 13 is also applied to synchronizing signal separator 16 wherein the synchronizing pulses in the composite signal are stripped and applied to the vertical and horizontal deflection circuits 17 and 18. Beam deflection signals are developed in these units in the usual manner and applied to the deflection yoke 19 of picture reproducing apparatus 20. Unit 18 additionally includes a high voltage power supply which provides the operating potential required by the high voltage anode 21 of picture tube 15. As will become clear hereinafter, control circuit 14, as embodied in FIG. 1, operates to limit the amount of beam current flowing in picture tube 15 while maintaining correct black level operation in the reproduced picture over the entire range of scene contents, independent of the nonlinear translation characteristics of picture tube 15 and video amplifier 13 respectively.

*Description and operation of picture control circuit 14 of FIG. 1*

Referring now more particularly to the picture control circuit 14 which embodies one form of the present invention, the arrangement there represented includes means, such as input terminal 22, for supplying a video signal having an average value which may vary from scene to scene and having a plurality of mutually related levels, hereinafter referred to as the black level, the blanking level and the synchronizing pulse peak level.

Control circuit 14 also includes means, such as the path including video amplifier 13 and network 23, for coupling the supplied video signal to the picture tube 15. Network 23 specifically includes a resistance-capacitance circuit 24, 25, 26, connected between the output of video amplifier 13 and output terminal 27, which, in turn, is connected to the cathode of picture tube 15 so that beam current flows through network 23.

Control circuit 14 additionally includes means, such as automatic-gain-control (AGC) circuit 28, coupled to the aforesaid coupling means for stabilizing the video signal black level at picture tube 15. The video signal developed on the picture tube side of network 23 is coupled to AGC circuit 28, and, more specifically, to the grid of triode 29 through the network 30 which includes resistors 31 and 32 and capacitor 33. The D.-C. component of the video signal developed on the video amplifier side of network 23 is coupled to AGC circuit 28, and, more specifically, to the cathode of triode 29 through the network 34 which includes resistors 35, 36, 37, and which provides the necessary bias for triode 29.

Triode 29 is keyed into plate current conduction by flyback pulses derived from transformer 39 of the horizontal sweep output circuit of unit 18 and applied directly to the plate of triode 29. Since the flyback or keying pulses have peak portions that occur in overlapping time relationship with the synchronizing pulses of the video signal, the AGC effect is derived only during the time at which the synchronizing pulses are present at the grid of triode 29. In other words, although AGC circuit 28 is included in control circuit 14 to stabilize the black level at picture tube 15, it is responsive to the synchronizing pulse peak level. The AGC signal so derived is coupled through conductor 40, transformer winding 39, network 41 and conductor 42 to the amplifiers within unit 11 to control the gain thereof so that the synchronizing pulse peaks are stabilized at the grid of triode 29 at a voltage that is very nearly equal to the bias voltage established at the cathode of triode 29.

AGC circuit 28 additionally operates to vary the magnitude of the supplied video signal in response to variations in its average value to limit the amount of beam current flowing in picture tube 15. This beam current limiting tends to reduce any annoying subjective effects that may be produced upon the viewer due to changes in scene brightness and to minimize the possibility of power supply overload on scenes having a high average brightness value. Referring once again to FIG. 1, the application of the supplied video signal to picture tube 15 causes beam current to flow, the direction of flow being such as to make the potential of the cathode of tube 15 positive with respect to the plate potential of video amplifier 13, and by an amount equal to the voltage drop across resistor 24. Since the amount of beam current that flows is proportional to the average brightness value of the transmitted scene, it follows that the voltage drop across resistor 24 is an indication of scene brightness. As the average brightness value of the transmitted scene increases, the voltage drop across resistor 24 increases and the increase in the synchronizing pulse peak level thereby produced at the cathode of picture tube 15 causes triode 29 to develop more AGC voltage. This increase in AGC voltage is coupled to the amplifier stages in unit 11, as previously described, to reduce the magnitude of the supplied video signal. In this manner, beam current limiting is achieved.

However, it is not too difficult to visualize that if AGC circuit 28 performs the dual functions of stabilizing the synchronizing pulse peak level at the grid of triode 29 and turning down the video gain to limit beam current, the net effect at the cathode of picture tube 15 would be that the blanking level of the video signal, and also the black level, would drift with respect to the level at which the synchronizing pulse peaks are stabilized. Thus, black level operation at picture tube 15 would be somewhat impaired. Furthermore, the amount of drift or variation would be related to changes in the amplitude of the video signal produced as a result of changes in the average value of the video signal, and, more particularly, as a result of changes in the average beam current flowing. Stated another way, the brighter the scene, the more beam current flowing, the more the amplitude of the video signal is reduced, and the more undesirable is the black level drift.

Control circuit 14 additionally includes means, such as the aforementioned networks 30 and 34, for compensating these black level variations so as to maintain correct black level operation in the reproduced picture. Circuit 14 operates to achieve this desired effect by providing a variable bias to the cathode of triode 29 to permit a variation in the level at which the synchronizing pulse peaks are stabilized at the grid of triode 29, and, therefore, to permit a variation in the level at which the synchronizing pulse peaks are stabilized at the cathode of picture tube 15. This is accomplished by coupling the linear change in D.-C. potential produced at the plate of video amplifier 13 due to the variations in the average value of the signal as scene brightness changes through network 34 to the cathode of triode 29. As a result, the drift in black level is corrected.

As thus far decribed, the operation of control circuit 14 is identical to the operation of the control circuit of the previously mentioned application, Ser. No. 309,774. However, in accordance with the teachings of the present invention, by establishing specific design interrelations between networks 23, 30, and 34, circuit 14 additionally operates to maintain correct black level operation in the reproduced picture independent of the nonlinearity characteristic and unequal A.-C./D.-C. translation characteristic of picture tube 15 and video amplifier 13, respectively.

In general, correct black level operation independent of the characteristics of picture tube 15 will result if control circuit 14 is constructed in accordance with the following expression:

$$K_{ac_A}=\frac{kK_{acp}}{R_{A/P}} \qquad (1)$$

where $K_{ac_A}$ represents the A.-C. transmission gain from input terminal 22 to the grid of triode 29, $K_{acp}$ represents the A.-C. transmission gain from input terminal 22 cathode of picture tube 15, $R_{A/P}$ represents the ratio of the amplitudes of the reference levels in the video signal which are stabilized at the grid of triode 29 and cathode of picture tube 15, respectively, in this case, the ratio of the synchronizing pulse peak level to the black level, where both are on the same normalized amplitude scale and where both are with respect to the level representing zero carrier, and $k$ represents the fraction of D.-C. voltage change at the cathode of picture tube 15, resulting from beam current change, which is coupled to the grid of triode 29.

Correct black level operation independent of the translation characteristics of video amplifier 13 will result if control circuit 14 is constructed in accordance with the following general expression:

$$K_{dc_K}=kK_{acp}\left(1-\frac{1}{R_{A/P}}\right)-(kK_{dcp}-K_{dc_A}) \qquad (2)$$

where $K_{dc_K}$ represents the D.-C. transmission gain from input terminal 22 to the cathode of triode 29, $K_{dcp}$ represents the D.-C. transmission gain from input terminal 22 to the cathode of picture tube 15, $K_{dc_A}$ represents the D.-C. transmission gain from input terminal 22 to the grid of triode 29, and $k$, $K_{acp}$ and $R_{A/P}$ are as previously defined.

Control circuit 14, as represented in FIG. 1, is constructed in accordance with the above general expressions. However, due to the presence of capacitor 33 in network 30, the above expressions as they specifically relate to circuit 14 may be simplified since capacitor 33 causes $k$ to equal unity and $K_{dcp}$ to equal $K_{dc_A}$. Thus, with respect to control circuit 14 of FIG. 1, expressions 1 and 2 may be simplified to appear as expression 1′ and 2′ below:

$$K_{ac_A}=\frac{K_{acp}}{R_{A/P}} \qquad (1')$$

$$K_{dc_K}=K_{acp}\left(1-\frac{1}{R_{A/P}}\right) \qquad (2')$$

Since, in the negative modulation television system employed in the United States, the video signal black level equals 70% of the synchronizing pulse peak level and since the level stabilized at the grid of triode 29 is the latter level, while the level stabilized at the cathode of picture tube 15 is the former level, $$R_{A/P}=\frac{100\%}{70\%}$$

or 1.43. Thus, for black level to be maintained constant in the reproduced picture independent of the characteristics of picture tube 15, $K_{ac_A}$ should equal $$\frac{K_{acp}}{1.43}$$

or 0.7 $K_{acp}$. This is accomplished in control circuit 14 of FIG. 1 by making $R_{32}=0.7\ (R_{32}+R_{31})$.

Similarly, for black level to be maintained constant in the reproduced picture independent of the characteristics of video amplifier 13, $K_{dc_K}$ should equal $$\left(1-\frac{1}{1.43}\right)K_{acp}$$

or 0.3 $K_{acp}$. This is accomplished by making $$R_{35}=0.7\left(R_{35}+\frac{R_{36}R_{37}}{R_{36}+R_{37}}\right)$$

In arriving at this equation for $R_{35}$, it was assumed that the A.-C. component of the video signal is transmitted without loss from the plate of video amplifier 13 to the cathode of picture tube 15, as isusually the case, and that the video amplifier 13 translates the A.-C. and D.-C. components of the wideo signal equally. If the A.-C. and D.-C. components of the video signal are not translated equally through amplifier 13, the equation for $R_{35}$ must be modified to read as follows:

$$R_{35}=(1-0.3\text{M})\left(R_{35}+\frac{R_{36}R_{37}}{R_{36}+R_{37}}\right)$$

wheren M equals the A.-C./D.-C. translation ratio of amplifier 13.

It is to be remembered that these expressions for $R_{32}$ and $R_{35}$ were derived for the specific case where *k* equals unity. If *k* were not equal to unity, these expressions would have to be modified accordingly.

Figure 2:
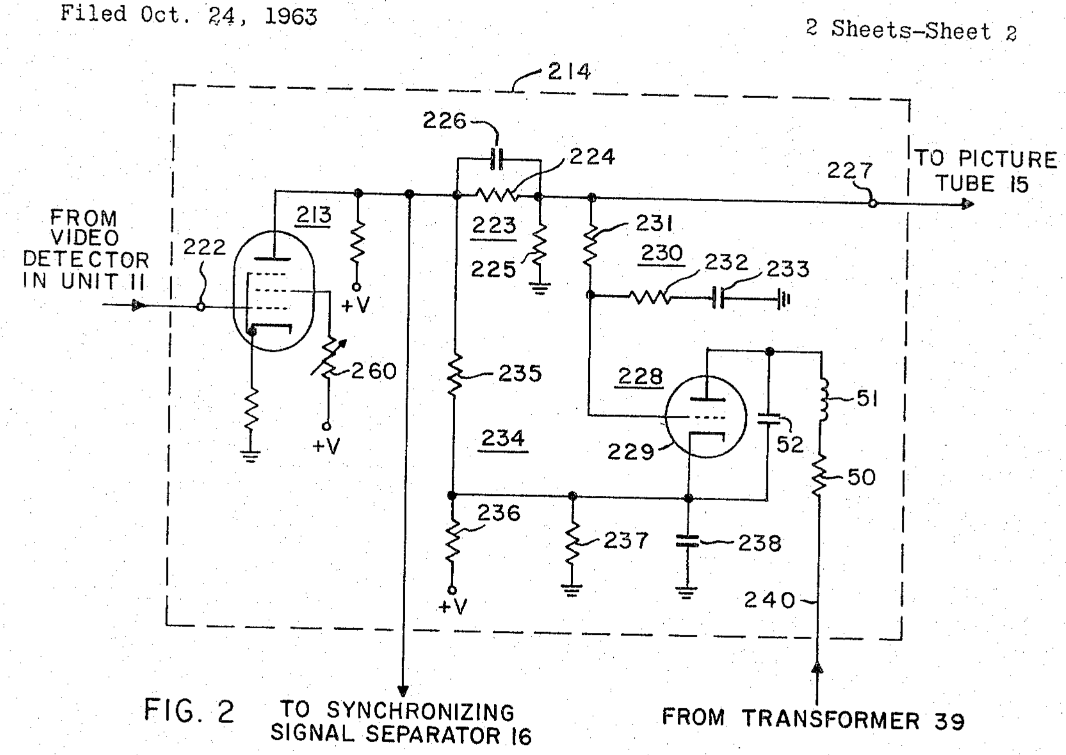
FIG. 2 is an alternative form of a picture control circuit constructed in accordance with the present invention.

*Picture control circuit 214 of FIG. 2*

There is shown in FIG. 2 a modified form of picture control circuit 214 similar to picture control circuit 14 of FIG. 1, in which corresponding components carry the same reference numerals as in FIG. 1 except preceded by the number "2." Control circuit 214 differs from the previously described circuit in that AGC circuit 228 operates to stabilize the blanking level of the video signal at the grid of triode 229 instead of the synchronizing pulse peak level. This is accomplished by coupling the flyback pulses from horizontal output transformer 39 to the plate of triode 229 through conductor 240 and a delay circuit including resistor 50, inductor 51 and capacitor 52. The delay is such that plate current conduction does not occur until after the synchronizing pulse portion of the video signal has ended, and the blanking interval has begun. Thus, AGC circuit 228 operates as a back porch keyed AGC circuit instead of as a sync peak keyed AGC circuit as in FIG. 1. Except for this difference, control circuits 14 and 214 are exactly alike in construction and operation.

Since, in the negative modulation television system employed in the United States, the video signal blanking level equals 75% of the synchronizing pulse peak level, $R_{A/P}$ for control circuit 214 of FIG. 2, equals the ratio of blanking level to black level $$\frac{75\%}{70\%}$$

or 1.07. For black level to be maintained constant in the reproduced picture independent of the characteristics of picture tube 15 and video amplifier 213, $K_{ac_A}$ should equal $$\frac{K_{acp}}{1.07}$$

or 0.93 $K_{acp}$ and $K_{dc_K}$ should equal $$\left(1-\frac{1}{1.07}\right)K_{acp}\text{ or }0.07\,K_{acp}$$

respectively. This is accomplished by making $R_{232}=0.93\ (R_{232}+R_{231})$ and $R_{235}=0.93$ $$\left(R_{235}+\frac{R_{236}R_{237}}{R_{236}+R_{237}}\right)$$

As was previously pointed out, a more general equation for $R_{235}$ would be as follows: $R_{235}=(1-.07\text{ M})$ $$\left(R_{235}+\frac{R_{236}R_{237}}{R_{236}+R_{237}}\right)$$

where M is as previously defined.

Figure 3:
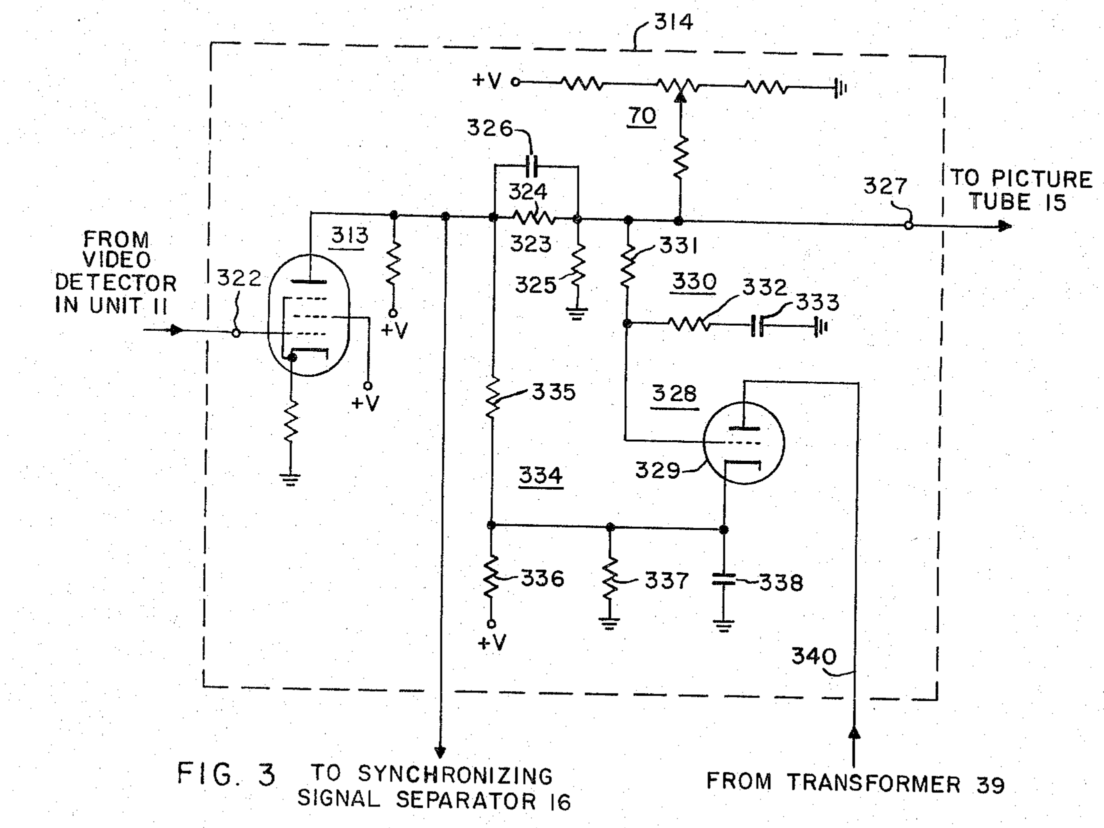
FIG. 3 is another form of picture control circuit constructed in accordance with the present invention.

*Picture control circuit 314 of FIG. 3*

There is shown in FIG. 3 another form of picture control circuit similar to picture control circuit 14 of FIG. 1 in which corresponding components carry the same reference numerals as in FIG. 1 except preceded by the numeral "3." Control circuit 314 differs from the previously described circuit in that contrast control 60 is transferred from the screen grid circuit of video amplifier 313 to the cathode circuit of picture tube 15. Otherwise the two circuits are identical. Since the magnitude of the supplied video signal is controlled by the amount of current flowing through resistor 324, a contrast control function can be provided by forcing D.-C. current through resistor 324 from a source other than picture tube 15, as from voltage supply +V and contrast control 70. With the same design interrelations established as were established in circuit 14, control circuit 314 operates to maintain correct black level operation in the reproduced picture independent not only of the characteristics of picture tube 15 and video amplifier 313 but independent of the particular setting of contrast control 70 as well.

It will readily be apparent that if the same contrast control modification were made to control circuit 214 of FIG. 2 as was made to control circuit 14 above, black level would again be maintained constant in the reproduced picture independent of picture tube and video amplifier characteristics and independent of contrast control setting.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A picture control circuit for a television receiver which utilizes a cathode-ray tube for purposes of image reproduction, comprising:

means for supplying a video signal having A.-C. components and a D.-C. component representative of average scene brightness which may vary from scene to scene, and having a synchronizing pulse level, a blanking level and a level intended to correspond to black in the reproduced image, said supply means including control means for varying the magnitude of said supplied video signal;

means, including a video signal amplifier, for translating said supplied video signal to the cathode of said cathode-ray tube with an A.-C. gain of $K_{acp}$ and a D.-C. gain of $K_{dcp}$, to a first input of an automatic-gain-control circuit with an A.-C. gain of $K_{ac_A}$ and a D.-C. gain of $K_{dc_A}$, and to a second input of said automatic-gain-control circuit with a D.-C. gain of $K_{dc_K}$, and for coupling a fraction $k$ of the D.-C. voltage changes occurring at the cathode of said cathode-ray tube to the first input of said automatic-gain-control circuit;

a keyed automatic-gain-control circuit having first and second inputs coupled to said translating means and responsive to a selected one of the levels in said video signal translated to said first input, for developing an output signal representative of the difference between said selected level and a reference potential, and wherein said reference potential is varied in accordance with changes in the average scene brightness of said supplied video signal by the video signal D.-C. component translated to said second input;

and means for coupling said automatic-gain-control output signal to said control means for varying the magnitude of said supplied video signal to stabilize said selected video signal level at the first input of said automatic-gain-control circuit, thereby stabilizing black level at the cathode of said cathode-ray tube, and limiting the amount of beam current flowing in the cathode-ray tube on scenes of high average brightness independent of any nonlinear characteristic and unequal A.C./D.C. translation characteristic of said cathode-ray tube and video amplifier.

2. A picture control circuit in accordance with claim 1 wherein said signal translating means and said automatic-gain-control circuit are constructed to operate in accordance with the following relationships:

$$K_{ac_A}=\frac{kK_{ac_P}}{R_{A/P}}$$

and $$K_{dc_K}=kK_{ac_P}\left[-\frac{1}{R_{A/P}}\right]-[kK_{dc_P}-K_{dc_A}]$$

where $R_{A/P}$=the ratio of the amplitudes of the selected level of the video signal stabilized at the first input of said automatic-gain-control circuit and the black level stabilized at the cathode of said cathode-ray tube, respectively, where both levels are on the same normalized amplitude scale and where both are with respect to the level representing zero carrier.

3. A picture control circuit in accordance with claim 2 wherein the selected level stabilized at the first input of said automatic-gain-control circuit is the synchronizing pulse level.

4. A picture control circuit in accordance with claim 2 wherein the selected level stabilized at the first input of said automatic-gain-control circuit is blanking level.

5. A picture control circuit in accordance with claim 1 in which said automatic-gain-control circuit includes a vacuum tube wherein the control grid and cathode of said vacuum tube are the first and second inputs, respectively, of said automatic-gain-control circuit, in which the selected level stabilized at the first input of said automatic-gain-control circuit is synchronizing pulse level, in which said fraction $k$ equals unity and in which said signal translating means and said automatic-gain-control circuit are constructed to operate in accordance with the following relationships:

$$K_{ac_A}=0.7\ K_{ac_P}$$

and $$K_{dc_K}=0.3\ K_{ac_P}$$

6. Picture control circuit in accordance with claim 1 in which said automatic-gain-control circuit includes a vacuum tube wherein the control grid and cathode of said vacuum tube are the first and second inputs, respectively of said automatic-gain-control circuit, in which the selected level stabilized at the first input of said automatic-gain-control circuit is blanking level, in which said fraction $k$ equals unity and in which said signal translating means and said automatic-gain-control circuit are constructed to operate in accordance with the following relationships:

$$K_{ac_A}=0.93\ K_{ac_P}$$

and $$K_{dc_K}=0.07\ K_{ac_P}$$

References Cited by the Examiner

UNITED STATES PATENTS

| | | | |
|---|---|---|---|
| 2,632,802 | 3/1953 | Vilkomerson et al. | 178—7.3 |
| 2,872,513 | 2/1959 | Kraft | 178—7.3 |

DAVID G. REDINBAUGH, *Primary Examiner.*

R. L. RICHARDSON, *Assistant Examiner.*